B. F. GOODRICH.
OIL STOVE FOR HEATING PURPOSES.
No. 11,225. Reissued Feb. 23, 1892.
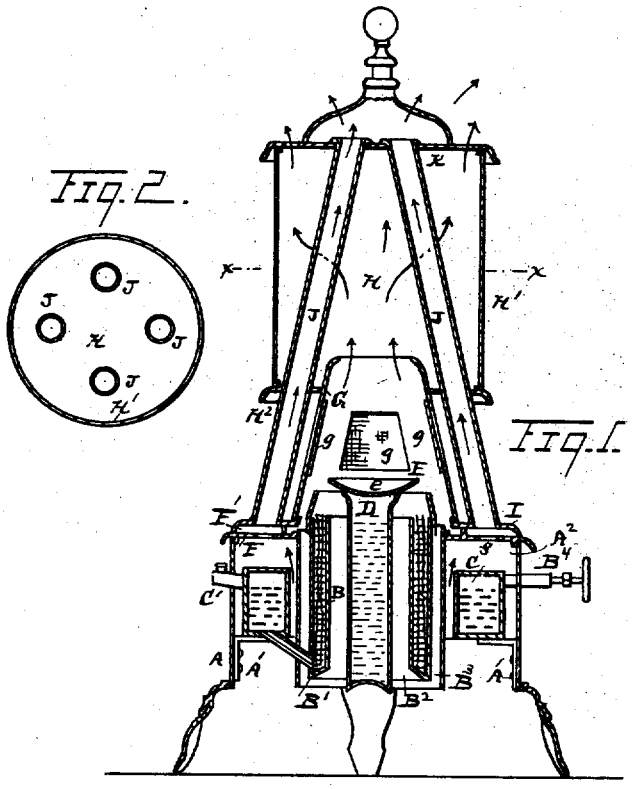
Witnesses
John Schuman.
John F. Miller
Inventor
Benjamin F. Goodrich.
By his Attorney
Newell S. Wright
THE NORRIS PETERS CO., PHOTO-LITHO., WASHINGTON, D. C.

UNITED STATES PATENT OFFICE.

BENJAMIN F. GOODRICH, OF HOMER, MICHIGAN.

OIL-STOVE FOR HEATING PURPOSES.

SPECIFICATION forming part of Reissued Letters Patent No. 11,225, dated February 23, 1892.

Original No. 459,531, dated September 15, 1891. Application for reissue filed December 7, 1891. Serial No. 414,352.

*To all whom it may concern:*

Be it known that I, BENJAMIN F. GOODRICH, a citizen of the United States, residing at Homer, county of Calhoun, State of Michigan, have invented certain new and useful Improvements in Oil-Stoves for Heating Purposes; and I declare the following to be a full, clear, and exact description of the same, such as will enable others skilled in the art to which it appertains to make and use the same, reference being had to the accompanying drawings, which form a part of this specification.

My invention has for its object a new and improved oil-stove for heating purposes; and it consists of the devices and appliances hereinafter specified and claimed, and illustrated in the accompanying drawings, in which—

Figure 1 is a vertical section embodying my invention, and Fig. 2 is a horizontal section on the line *x x*, Fig. 1.

I carry out my invention as follows:

A represents the base of the stove, within which is located a burner, preferably a tubular burner B, and an oil-tank C, properly communicating with the burner. Within the burner and surrounded thereby I locate a water-reservoir D, which may lead from the base to the upper end of the burner, said water-reservoir being open at its upper end and surmounted by a deflector E, located over the burner, said deflector preferably being perforated, as shown at *e*.

Between the water-reservoir and the wick-chamber B′ of the burner is an air-space $B^2$, and an additional air-space $B^3$ surrounds the wick-chamber. The burner, with its water and oil reservoirs, may be supported in the base of the stove in any suitable manner, as by bracket-arms A′. It will be understood that the base of the stove is open for the free passage of air to the burner and other parts of the stove. A cold-air chamber $A^2$ is formed above and around the oil-reservoir and communicates with the open base. This construction allows a constant circulation of air about the oil-reservoir, whereby it is always kept cool.

The water-reservoir may be provided with any desired means for filling the same. Thus, for instance, it may be filled through the perforations in the deflector above it.

C′ is the filter of the oil-tank.

$B^4$ is the operating-spindle of the burner for turning the wick.

F is a collar engaged to the base over the oil-reservoir, the same being perforated, as shown at *f*.

Above the burner is located a combustion-chamber, preferably constructed in the form of a conical chimney G, in which plates of mica may be engaged, as shown at *g*. The chimney or combustion-chamber G communicates at its upper end with an additional combustion-chamber H. This chamber H is formed by a cylindrical drum H′, forming the upper portion of the stove. Into this upper chamber H and through the same I conduct air-flues J, preferably four in number. At the base the air-flues are engaged with a collar I, surmounting the base A of the stove and fitting about the base of the chimney G. Said flues communicate through this collar I with the open air-chamber $A^2$ in the base of the stove. The location of the collar I above the collar F forms an intermediate air-chamber F′, through which air is communicated from the base into said flues. At the base of the drum H′ is another annular plate $H^3$, forming a closed base at the bottom of the chamber H between the drum and the periphery of the chimney G. The flues J preferably converge in the upper part of the chamber H over the chimney, in order thus to receive the concentrated heat from the burner. The flues are engaged in and communicate through an upper annular plate K, located at the top of the drum H′, said plate being perforated to allow the passage of the heat from the combustion-chambers.

It will be evident that as the water-reservoir is located it is adapted to supply vapor to the flame of the burner to assist materially the process of perfect combustion. So, also, it will be seen that the provision of the air-flues promotes a thorough circulation of air therethrough, which, in a heated condition, is discharged, together with the heated air from the combustion-chamber, into the room.

What I claim as my invention is—

1. In an oil-stove, the combination, with a base, of an oil-burner located therein, a drum H′, located above said base and spaced therefrom, a cone-shaped combustion-chamber located above the burner, communicating with the interior of said drum, and air-flues extending upward along the outside of the combustion-chamber and entering the drum, as set forth.

2. In an oil-stove, the combination, with the base provided with a perforated plate F, of a communicating oil-reservoir and wick-chamber separated to form separate air-spaces, a plate I, seated upon the plate F and spaced therefrom to form an air-chamber, a chimney supported upon said plate I, flues led through said plate I and communicating with the space F, and a chamber H, surrounding the upper end of the chimney and embracing the upper portions of the flues which extend entirely through it, said chamber provided with hot-air exits, substantially as described.

3. In an oil-stove for heating purposes, the combination, with a base, of an oil-burner located therein, an open air-chamber about the oil-reservoir of the burner, a combustion-chamber above the burner, and air-flues communicating at their lower extremities with said open air-chamber and at their upper extremities through said combustion-chamber, substantially as described.

4. In an oil-stove, the combination, with a wick-chamber B′, of a water-reservoir D, occupying the center of the inclosure formed within said wick-chamber, an open air-passage $B^2$, separating the wick-chamber from the water-reservoir, and a perforated deflector E, centrally supported by said water-reservoir within said inclosure, substantially as described.

In testimony whereof I sign this specification in the presence of two witnesses.

BENJAMIN F. GOODRICH.

Witnesses:

JAMES M. MERRITT,

DWIGHT W. KNICKERBACKER.